S. P. MECAY.
Churn.

No. 223,599. Patented Jan. 13, 1880.

WITNESSES
Robert Everett
Chas. G. Page

INVENTOR
Samuel P. Mecay
Gilmore, Smith & Co.
ATTORNEYS

UNITED STATES PATENT OFFICE.

SAMUEL P. MECAY, OF KILLBOURNE, OHIO.

CHURN.

SPECIFICATION forming part of Letters Patent No. 223,599, dated January 13, 1880.

Application filed November 22, 1879.

*To all whom it may concern:*

Be it known that I, SAMUEL P. MECAY, of Killbourne, in the county of Delaware and State of Ohio, have invented certain new and useful Improvements in Churns; and I do hereby declare that the following is a full, clear, and exact description of the construction and operation of the same, reference being had to the annexed drawings, making a part of this specification, and to the letters and figures of reference marked thereon.

Figure 1:
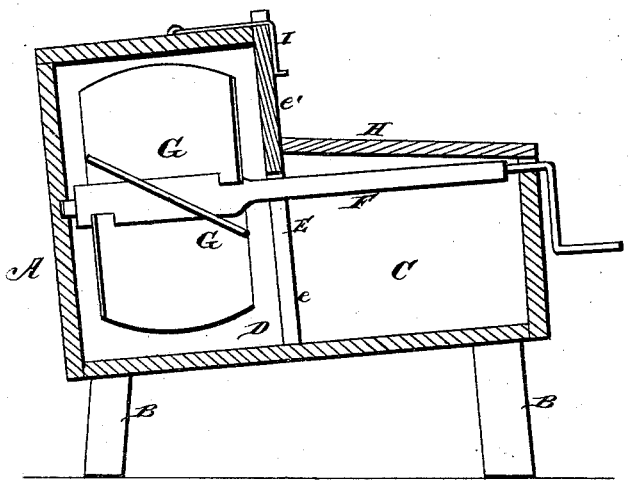
Figure 2:
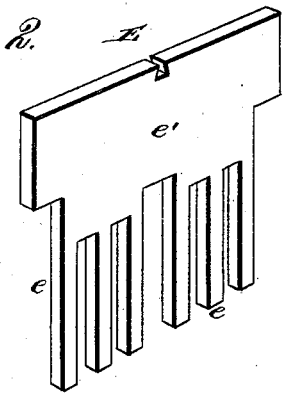

Figure 1 of the drawings is a representation of a longitudinal section of my churn, and Fig. 2 is a perspective of the partition.

My present invention relates to churns; and it consists in a churn-body divided into two compartments by a removable slotted partition and a rotary dasher-shaft provided with blades or dasher-paddles set at angles to its axial line and arranged within a compartment at one end of the churn, so that during the rotation of the dasher the cream or milk will pass back and forth from one compartment to the other between the breaker-slats of the partition in a rotary current, all as more fully set forth in the following description, and particularly pointed out in the claim.

Referring by letter to the drawings, A designates the churn-body, which is supported by means of suitable legs B, and divided into two compartments, C D, by a removable slatted partition, E. The bottom of this churn-body inclines downward toward its end, at which the compartment D is located, so as to insure the reflow of cream or milk into the said compartment from the compartment C, into which it has been forced by the rotary dasher.

The surrounding walls of the compartment D are somewhat higher than those of the compartment C, so as to adapt its area to the dimensions of the dasher, which is inclosed therein, and it is also closed at the top by a cover, which is preferably secured permanently in place.

The dasher-shaft F is journaled in the end walls of the body A, and its dasher is formed by a series of blades, G, secured thereon at an angle to its axial line.

The removable partition E is formed with a series of slats or breakers, e, between which the cream or milk passes from one compartment to another during the rotation of the dasher. This partition is held in place by means of the cover H, which closes the top of the compartment C and fits against the partition, so as to hold it against the upper edges of the walls of partition D, and it is further held in position by means of a spring-fastening, I. The lower portion of the partition, being formed with open slats, affords communication between the two compartments, while its upper solid portion, e', closes up the opening at the side of partition D above the line of the cover H.

During the rotation of the dasher the milk or cream will be drawn by the blades from one side to the other of the compartment D, and thence forced out between the slats or breakers of the partition E into compartment C, which, during the churning, will be closed by its cover. The fluid and air will then flow back into compartment D in order to replace that portion of the same primarily drawn from one side of the said latter compartment, thereby maintaining a continuous rotary current through the slatted partition and the two compartments.

In order to gather the butter after churning, the operator will take out the partition and slowly rotate the dasher, thereby forming a solid lump of butter.

As herein shown, the dasher-shaft is provided with a crank-handle, whereby it may be conveniently rotated.

Having thus described my invention, what I claim, and desire to secure by Letters Patent, is—

The combination, with the herein-described rotary dasher having its blades at an angle to the shaft, of the churn-body, divided into two compartments, C and D, by the removable partition E, formed with open slats e, and held in position between the cover H and the upper part of the walls of the compartment D, substantially as shown and described.

In testimony that I claim the above I have hereunto subscribed my name in the presence of two witnesses.

SAMUEL P. MECAY.

Witnesses:
W. WHEELER,
D. M. DOUGLASS.